United States Patent [19]

Perrott et al.

[11] Patent Number: 5,385,172
[45] Date of Patent: Jan. 31, 1995

[54] PING-FREE WATER HAMMER ARRESTER

[75] Inventors: Charles H. Perrott, Portland, Oreg.; Suzuki Kouichi, Tokyo, Japan

[73] Assignees: Precision Plumbing Products, Inc., Portland, Oreg.; Venn Co., Ltd., Tokyo, Japan

[21] Appl. No.: 176,948

[22] Filed: Jan. 3, 1994

[51] Int. Cl.6 .............................................. F16L 55/04
[52] U.S. Cl. ......................................... 138/31; 138/26
[58] Field of Search .............................. 138/26, 30, 31

[56] References Cited

U.S. PATENT DOCUMENTS

| 3,158,180 | 11/1964 | Greer | 138/31 |
|---|---|---|---|
| 3,613,734 | 10/1968 | Elmer | 138/31 |
| 3,633,627 | 1/1972 | Perrot et al. | 138/31 |
| 4,819,698 | 4/1989 | Ismert | 138/31 |
| 4,878,519 | 11/1989 | Berding et al. | 138/31 |
| 5,031,664 | 7/1991 | Alaze | 138/31 |

Primary Examiner—Timothy F. Simone
Assistant Examiner—Patrick F. Brinson
Attorney, Agent, or Firm—Eugene D. Farley

[57] ABSTRACT

A water hammer arrester comprises a cylindrical body housing a piston for free sliding reciprocal movement and a connector for connection to a water conduit system which carries water under pressure. An abutment-bumper combination is interposed between piston and connector to avoid the ping which would be produced is these two elements of the assembly were to collide during reciprocation of the piston.

3 Claims, 1 Drawing Sheet

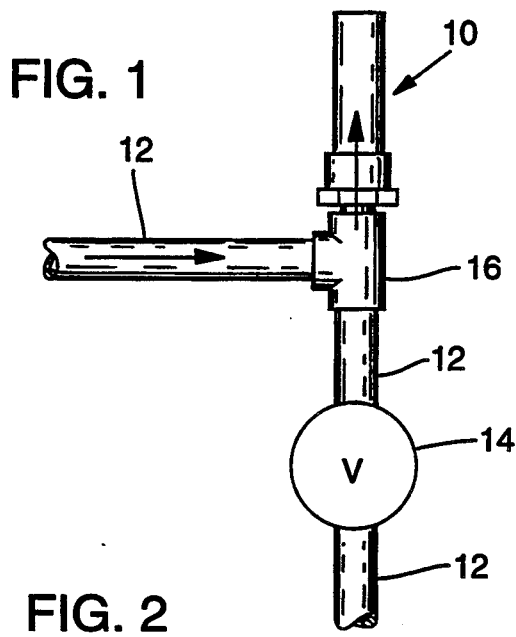
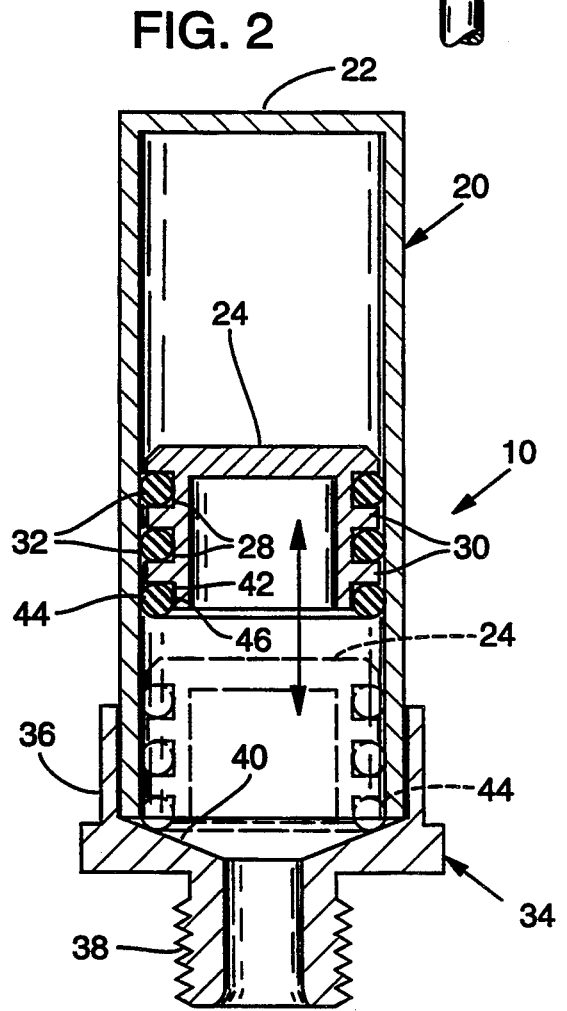
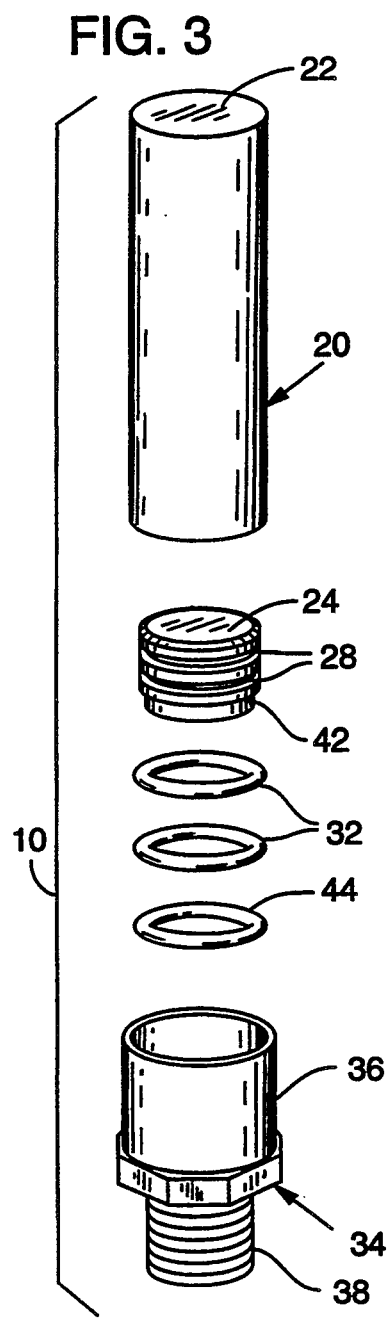

PING-FREE WATER HAMMER ARRESTER

BACKGROUND OF THE INVENTION

1. Field of the Invention

This invention relates to water hammer arresters; i.e. to devices for preventing the development of water hammer in conduits conveying water under pressure and under conditions of interrupted flow.

2. Description of the Prior Art

The familiar phenomenom of water hammer is caused by the development of hydraulic shock waves generated by the sudden stopping of fluid flow within the confines of a conduit system carrying water under pressure. This condition results from the rapid closing of positive valves incorporated within the system. In addition to the production of unpleasant noise effects, fluid hammer if allowed to persist for any length of time, will result in broken conduits and damage to other components of the conduit system.

Various types of fluid hammer arresters are known to the prior art. The most commonly employed of such devices includes expandable bellows or diaphragms which absorb the shock. These are so subject to failure that their service life is short.

Another type of fluid hammer arrester involves the application of a piston working against the pressure developed by a compressed gas chamber. Such a device is disclosed in Perrott et al, U.S. Pat. No. 3,633,627. Although widely and successfully used, water hammer arresters of the Perrott et al class are characterized in use by a noise generating problem. When subjected to rapid and substantial pressure drop, the metallic piston with which they are provided occasionally forcibly contacts an opposed metallic wall. This causes the production of an unpleasant metallic sound, or "ping". The arresters accordingly defeat their own purpose in that they themselves become a sound-producing instrument.

It is the general purpose of the present invention to provide a water hammer arrester which overcomes this problem, and which is ping-free.

THE PRESENT INVENTION

In accordance with the present invention, a ping-free water hammer arrester is provided which comprises a hollow cylindrical body closed at one end and open at the other. A piston is freely slidable within the body and forms in the closed end thereof a hermatically sealed gas chamber.

A hollow, cylindrical connector ("nipple"), open at both ends, is secured to the open end of the body for connection to a conduit conveying fluid under pressure. This places the body in open communication with the conduit, and the fluid in the conduit in pressure contact with the piston. Reciprocation of the piston with fluctuation in fluid pressure between advanced and retracted positions accordingly occurs.

An abutment is provided on the connector. It is positioned opposite the piston and in its path of travel.

A shock absorbing bumper is mounted on mounting means which positions it between, the piston and the abutment. The bumper is of resilient material and absorbs the shock of the piston if it should slam into the abutment. The noise problem accordingly is eliminated.

THE DRAWINGS

In the drawings:

FIG. 1 is a fragmentary view in side elevation of a piping system including the herein described water hammer arrester.

FIG. 2 is a longitudinal sectional view of the arrester in its assembled condition.

FIG. 3 is an exploded top perspective view of the arrester.

DESCRIPTION OF A PREFERRED EMBODIMENT OF THE INVENTION

The presently described water hammer arrester is indicated generally at 10, FIG. 1. It is adaptable for installation in fluid conveying systems wherever there is a likelihood of the development of fluid hammer. Such a situation is present in the illustrated example where there is fluid flow through a conduit system 12 including a valve 14. As is well known, closing the valve suddenly and thus arresting the flow of fluid through the conduit system may result in setting up water hammer conditions.

In general, the water hammer arrester should be placed as near the source of shock as possible. It also should be installed in such a manner that there is an unobstructed shock path to the arrester.

Thus, in the illustration of FIG. 1, the arrester may be included in the conduit system simply by inserting a T 16 to which the arrester 10 is coupled.

The construction of the arrester and its manner of operation are shown in detail in FIGS. 2 and 3.

The arrester includes a hollow cylindrical body 20 which is closed at one end 22. It may be made of brass or other suitable metal.

A piston indicated generally at 24 is freely slidable within the cylindrical body. Its peripheral surface is formed with annular grooves 28 and intervening lands 30. Sealing rings (O-rings) 32 seat in the grooves. They may be made of natural or artificial rubber, plastic or other suitable material.

A connector indicated generally at 34 by means of which the arrester is coupled to the fluid conducting system is mounted by soldering or other suitable method on the open end of cylinder 20.

The connector has a cylindrical body or cap segment 36 which fits over the open end of cylindrical body 20 and in sealed relation thereto, as by means of soldering. A threaded attaching segment 38 facilitates its application to the piping components of the system.

The foregoing arrangement places cylinder 20 in open communication with the conduit components of the system. It also places the fluid in the conduit in pressure contact with the piston, whereby to reciprocate the piston with fluctuations in water pressure between a retracted position in which the piston is housed within the cylinder, and an advanced position in which it can progress into contact with connector 34. Since both of these components may be made of metal, there may result the "ping" which it is the purpose of this invention to prevent.

To this end, there is provided an abutment on connector 34. This is positioned opposite the piston and in its path of travel. In the illustrated form of the invention, the abutment comprises inwardly tapered (with reference to the direction of travel of the piston) abutment surface 40. This preferably is contoured in the geometry of a truncated cone, as is evident from FIG. 2.

Shock-absorbing bumper means are positioned between piston 24 and abutment surface 40. Although the bumper means may be positioned on either one of these two components, it preferably is mounted on piston 24.

To this end the forward (with reference to the direction of travel) margin of the piston is provided with an annular marginal recess 42. This recess seats a resilient bumper ring, such as O-ring 44. As in the case of O-rings 32, O-ring 44 may be fabricated from natural or synthetic rubber, or a suitable resilient plastic.

Adhesive 46 is interposed between the bumper ring and the recess in which it is seated to insure against displacement during operation of the assembly.

OPERATION

In the operation of the herein described ping-free water hammer arrester, the unit is inserted in the water conduit system in the manner illustrated in FIG. 1. As fluctuations in house line water pressure occur, piston 24 will reciprocate inside cylinder 20. This absorbs the pressure shocks and prevents water hammer.

In the event that metallic piston 24 should slam against metallic connector 34 during operation of the device, the collision is prevented and the shock absorbed, by virtue of bumper ring 44 of the piston colliding with abutment surface 40 of the connector.

Both water hammer noise and arrester ping thus are eliminated in a simple, integral device.

It is to be understood that the form of my invention herein shown and described is to be taken as a preferred example of the same and that various changes in the shape, size and arrangement of parts may be resorted to without departing from the spirit of my invention or the scope of the subjoined claims.

We claim:

1. A ping-free water hammer arrester comprising:
   a) a hollow cylindrical body closed at one end and open at the other,
   b) a piston freely slidable within the body and forming in the closed end thereof a hermetically sealed gas chamber,
   c) a hollow, cylindrical connector open at both ends and secured to the open end of the body for connection to a conduit conveying fluid under pressure, thereby placing the body in open communication with the conduit, and the fluid in the conduit in pressure contact with the piston, whereby to reciprocate the piston with fluctuations in fluid pressure between a retracted position and an advanced position,
   d) an abutment on the connector positioned opposite the piston and in its path of travel,
   e) resilient shock-absorbing bumper means, and
   f) bumper means mounting means positioning the bumper means between the piston and the abutment for impact by the piston,
   g) the bumper means mounting means being positioned on the end of the piston facing the abutment.

2. A ping-free water hammer arrester comprising:
   a) a hollow cylindrical body closed at one end and open at the other,
   b) a piston freely slidable within the body and forming in the closed end thereof a hermetically sealed gas chamber,
   c) a hollow, cylindrical connector open at both ends and secured to the open end of the body for connection to a conduit conveying fluid under pressure, thereby placing the body in open communication with the conduit, and the fluid in the conduit in pressure contact with the piston, whereby to reciprocate the piston with fluctuations in fluid pressure between a retracted position and an advanced position,
   d) an abutment on the connector positioned opposite the piston and in its path of travel,
   e) resilient shock-absorbing bumper means, and
   f) bumper means mounting means positioning the bumper means between the piston and the abutment for impact by the piston,
   g) the bumper means comprising a resilient 0-ring and O-ring mounting means mounting the O-ring on the piston.

3. The water hammer arrester of claim 2 wherein the O-ring mounting means comprises adhesive means.

* * * * *